United States Patent [19]

Durand

[11] 4,194,059
[45] Mar. 18, 1980

[54] ASSEMBLY FOR AN ELECTROCHEMICAL DEVICE COMPRISING A PLATE AND A SUPPORT

[75] Inventor: Pierre Durand, Clermont-Ferrand, France

[73] Assignee: Compagnie Generale des Etablissements Michelin, Clermont-Ferrand, France

[21] Appl. No.: 968,010

[22] Filed: Dec. 11, 1978

Related U.S. Application Data

[63] Continuation of Ser. No. 859,442, Dec. 12, 1977, abandoned.

[30] Foreign Application Priority Data

Dec. 20, 1976 [FR] France .............................. 76 38622

[51] Int. Cl.² ............................................. H01M 4/00
[52] U.S. Cl. ...................................... 429/27; 429/208; 429/209; 429/247
[58] Field of Search ..................................... 429/27–29, 429/128, 144, 145, 208, 209, 247

[56] References Cited

U.S. PATENT DOCUMENTS

| 2,514,151 | 7/1950 | Berg et al. ........................ 429/208 X |
| 2,907,809 | 10/1959 | Southworth, Jr. et al. ........... 429/27 |
| 3,491,181 | 1/1970 | Keil et al. ............... 264/219 |
| 3,837,921 | 9/1974 | Henssen ................... 429/27 |
| 4,054,726 | 10/1977 | Sauer et al. ........................ 429/27 X |

Primary Examiner—Charles F. Lefevour
Attorney, Agent, or Firm—Brumbaugh, Graves, Donohue & Raymond

[57] ABSTRACT

An assembly intended to be used in an electrochemical device comprises a plate and support. The plate has a bend on at least one edge, the peripheral zone of said bend being situated in the support which is obtained by molding one or more moldable materials on said zone. Thus, a face of the support adjacent the zone adjoins a face of said plate, forming a uniform junction surface, these faces being intended to be in contact with a fluid in movement in the electrochemical device, the angle α formed by this face of the plate with the extension of the corresponding face of the zone being located outside the plate.

12 Claims, 9 Drawing Figures

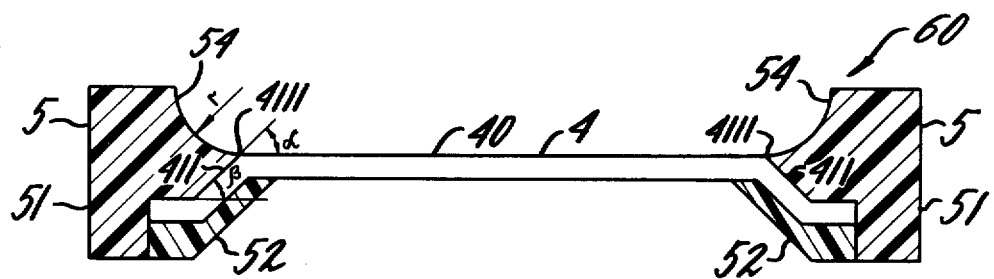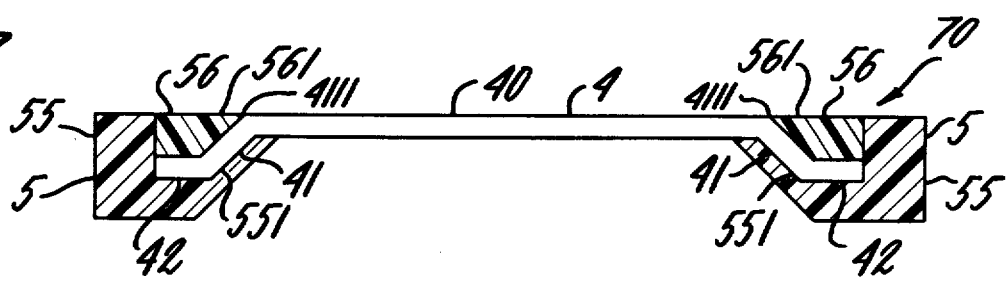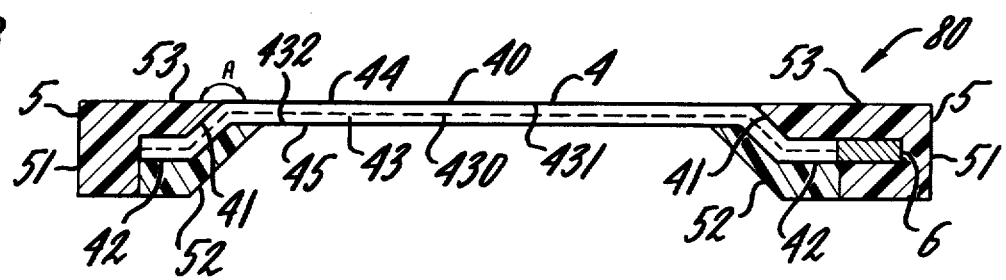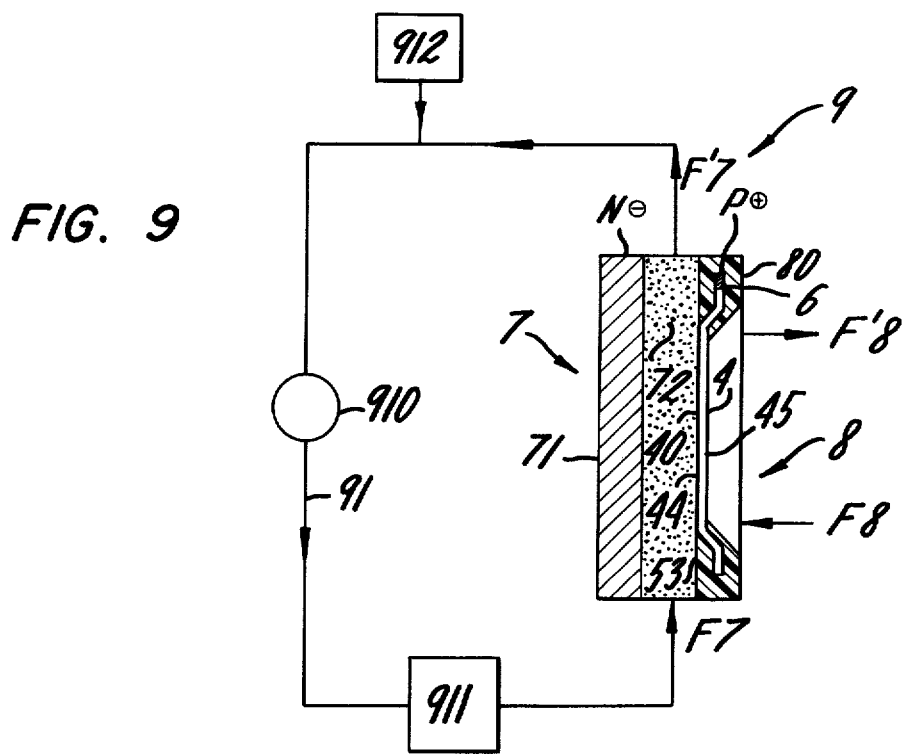

ASSEMBLY FOR AN ELECTROCHEMICAL DEVICE COMPRISING A PLATE AND A SUPPORT

This is a continuation, of application Ser. No. 859,442 filed Dec. 12, 1977 now abandoned.

This invention relates to devices employing electrochemical reactions as well as to the processes employed in these devices.

These devices comprise a cell having at least one anode compartment and one cathode compartment. Each of these compartments comprises an electrode with at least one active material participating in the electrochemical reaction carried out in said compartment, and an electrically conductive member, referred to as the electron collector, intended to collect the electric charges liberated during the electrochemical reaction or to deliver the electrical charges necessary for said reaction, which collector may be part of the electrode.

The invention concerns, in particular, electrochemical devices at least one compartment of which contains a fluid in movement, said fluid being in contact with one face of a plate. This plate, which is mounted in a support, constitutes, for instance, a separator, in particular an ion-permeable separator, or an electrode of a polarity opposite that of the compartment in which the fluid is contained.

The production of the assembly of the plate and support is customarily effected in the following manner:

the plate is cut out along a given geometrical profile and to precise dimensions;

production by machining or molding of a support comprising, recessed therein, a profile of a shape identical to that of the edges of the plate;

assembling of the plate to the support by gluing, the purpose of this glue being to assure the mechanical holding of the plate and the tightness of the assembly with respect to fluid;

finishing operation directed at obtaining, by scraping off the excess glue, uniform surfaces in the vicinity of the junctions of the plate with the glue.

This method of mounting has the following drawbacks:

(a) it requires a succession of manual operations which are lengthy, costly, and nonreproducible, since the quality of the finished product is due to a large extent to the skill of the operator;

(b) the scraping may well damage the surface of the plate;

(c) it is impossible to obtain perfectly uniform junction surfaces, despite a careful scraping off of the excess glue;

as a matter of fact, irregularities remain at the junction surfaces in the form of hollows or roughnesses which cause heterogeneities in the circulation of the fluid with spaces in which the fluid is stagnant without being renewed; as a result, there takes place in these spaces in accumulation of reaction products or of active material, particularly when the fluid is a liquid, for instance an electrolyte, which causes passivation phenomena as a result of insufficient diffusion velocities; furthermore, when the fluid contains solid or liquid particles, the accumulation of said particles in the spaces where the fluid is stagnant rapidly leads to the obstruction of the compartment; the device thus becomes rapidly unusable;

(d) in order to avoid the appearance of bubbles in the glue, it is necessary to limit its thickness, with the result that the mechanical strength of the assembly and its tightness to fluid is made very questionable. The mechanical strength and the tightness are still more difficult to obtain when the plate has a material which is difficult to glue on one of its surfaces. This is true, in particular, of gaseous diffusion electrodes having a hydrophobic coating or a hydrophobic membrane.

The purpose of the invention is to avoid these drawbacks.

Accordingly, the assembly in accordance with the invention, which is intended to be used in an electrochemical device, this assembly comprising a plate and a support, is characterized by the fact that the plate has a bend forming a bend line on at least one edge, the peripheral zone of said bend, referred to as the anchoring zone, being situated in the support, and at least a portion of the support being obtained by the molding of one or more moldable materials onto said anchoring zone in such a manner that a face of the support adjacent to the anchoring zone connects with a face of said plate along a connecting line forming a uniform junction surface, these faces being intended to be in contact with a fluid in movement in the electrochemical device, an angle $\alpha$ determined, in the vicinity of the bend line, by said face of the plate and the extension of the corresponding face of the anchoring zone being situated outside the plate, said angle $\alpha$ being measured in a plane perpendicular to said face of the plate and to said extension of the corresponding face of the anchoring zone.

The invention will be readily understood by means of the description of illustrative, nonlimitative examples given below with reference to the drawing, in which:

FIG. 1 shows schematically a cross section of a known assembly;

FIGS. 2 and 3 each show schematically a cross section of an assembly effected by molding;

FIG. 6 shows schematically a cross section of another assembly in accordance with the invention;

FIG. 7 shows schematically a cross section of still another assembly in accordance with the invention;

FIG. 8 shows schematically a cross section of yet another assembly in accordance with the invention in which the plate is a gaseous diffusion electrode; and FIG. 9 shows schematically a cross section of an electrochemical device using the assembly shown in FIG. 8.

Figure 1:
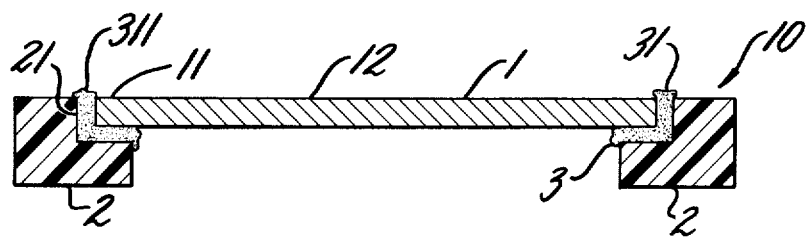

FIG. 1 shows an assembly 10 comprising a plate 1 and a support 2, this assembly being produced in known manner. The plate 1, for instance, is of rectangular shape, the support 2 being arranged around said plate. The support 2 has a recess 21 which corresponds substantially, in recess, to the profile of the edge 11 of the plate 1. A glue 3 makes it possible to assemble the plate 1 to the support 2.

The assembly 10 is intended to be mounted in an electrochemical device (not shown in this figure) in such a manner that the face 12 of the plate 1 is in contact with a moving fluid. The plate 1 may, for instance, be a separator or an electrode.

The surface 31 of the glue 3 which assures the connection of the support 2 with the face 12 of the plate 1 is referred to as the junction surface. This junction surface 31, which is intended to be also in contact with the fluid, has irregularities 311, which irregularities 311 are impossible to avoid completely, even with a careful scraping off of the excess of the glue 3.

Moreover, the amount of glue 3 is necessarily small in order to avoid the appearance of bubbles during the effecting of the assembling and during the drying of this glue 3. One then observes the drawbacks described above.

Figure 2:
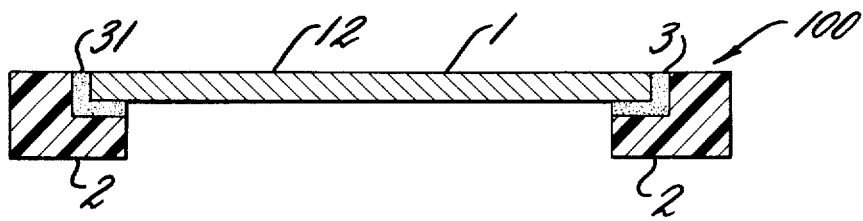

FIG. 2 shows another assembly 100 of the plate 1 with the support 2. In this assembly 100, the molded product 3 was introduced by molding between the support 2 and the plate 1 in such a manner that the junction surface 31 does not have any irregularities, this junction surface 31 and the face 12 of the plate 1 being located in the extension of each other.

This assembly 100 avoids heterogeneities in flow of the fluid in the electrochemical device and limits the number of operations to be carried out in order to effect the assembling, but on the other hand the mechanical strength and the tightness of the assembly 100 are still insufficient, since the molded product 3 at no place covers or overlaps the face 12, so that the drawbacks described above are avoided only for a short period of use.

Figure 3:
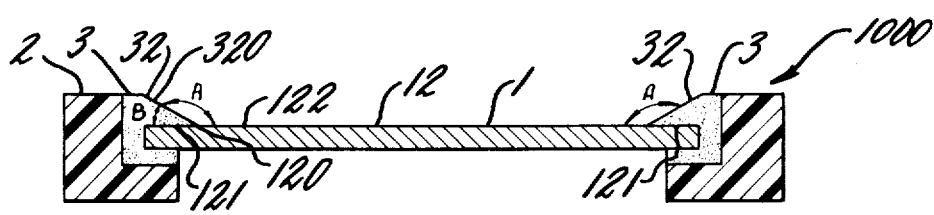

FIG. 3 shows another assembly 1000, in which the portion 32 of the molded product 3 covers or overlaps the portion 121 of the face 12 of the plate 1. The junction surface 320 of this portion 32 connects with the face 12 along the connecting line 120.

This junction surface 320 forms the angle A with the portion 122 of the face 12 not covered or overlapped by the portion 32, said portion 122 and the junction surface 320 being in contact with the fluid. The angle A is measured in the vicinity of the connecting line 120, in a plane perpendicular to the junction surface 320 and to the portion 122 (plane of FIG. 3).

Despite the covering or overlapping of the portion 121, this assembly 1000 is, however, fragile when the angle A is greater than 160° as a result of the accentuated wedge shape of the portion 32. As a matter of fact, the angle B of this wedge, measured in the vicinity of the connecting line 120 and perpendicular to the junction surface 320 and the portion 121, is then less than 20°, since it is equal to 180°−A. This fragility becomes particularly critical when the angle A is equal to 180°, that is to say when the junction surface 320 and the face 12 connect tangentially with each other. Furthermore, poor union may take place between the molded product 3 and the plate 1, causing defective tightness of this assembly 1000 whatever the angle A.

Figure 4:
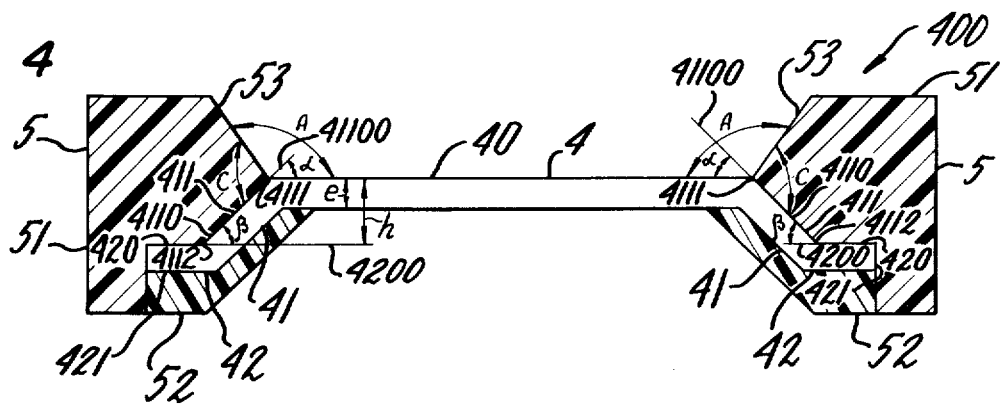
FIG. 4 shows schematically a cross section of an assembly in accordance with the invention taken on section line IV—IV of FIG. 5.
Figure 5:
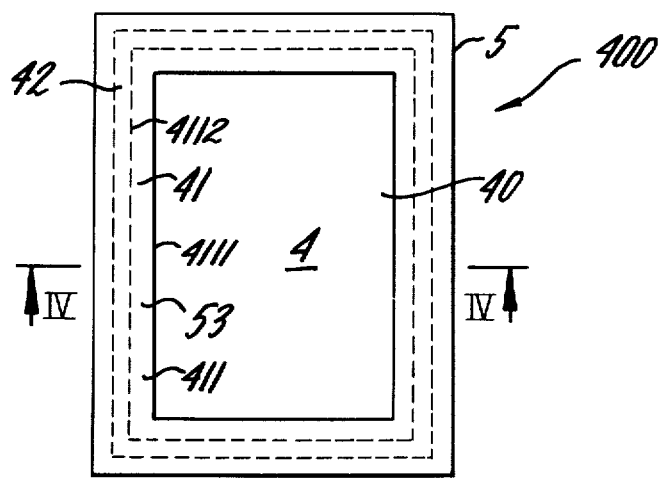
FIG. 5 shows schematically a top plan view of the assembly shown in FIG. 4.

FIGS. 4 and 5 show an assembly 400 in accordance with the invention. This assembly 400 comprises a plate 4 which is identical to the plate 1 except that it has bends 41 on its edges. The face 40 of the plate 4 is intended to be in contact with a fluid when the assembly 400 is used in an electrochemical device (not shown in this figure). The peripheral portion 411 of each bend 41, called the anchoring zone, comprises a face 4110 corresponding to the face 40. In the vicinity of the bend line 4111 of each bend 41, said bend line 4111 separating the faces 40 and 4110, the face 40 forms with the extension 41100 of the face 4110 an angle $\alpha$ located outside the plate 4, this angle $\alpha$ being measured in a plane perpendicular to the face 40 and to the extension 41100 of the face 4110 (plane of FIG. 4). In order to simplify the assembling, the angles $\alpha$ of the bends 41 of the assembly 400 may have the same value, but this is not necessary. The bends 41 of angle $\alpha$ can be obtained either directly upon the production of the plate or by a mechanical operation carried out subsequently on the plate after its production, for instance a shaping operation by stamping or pressing. The assembly 400 was obtained by placing the plate 4 in a mold (not shown) and by producing the reinforcements 51 and 52 constituting the support 5 by introducing into the mold a moldable material, for instance a thermoplastic or thermosetting material. The face 53 of the reinforcement 51 connects with the face 40 along a connecting line which is, for instance, substantially identical with the bend line 4111 of the corresponding bend 41. The face 53, which is therefore a junction surface and which is without irregularities, forms with the face 40 of the plate 4 the angle A, the definition of which is identical to that given above for the angle A shown in FIG. 3, the angles A of the assembly 400 having, for instance—but not necessarily—the same values. This face 53 of the support 5 forms the angle C with the face 4110 of the bend 41, said angle C being measured at the vicinity of the bend line 4111 and in a plane perpendicular to the faces 53 and 4110 (plane of FIG. 4). The angle C is equal to $180° + \alpha - A$ and, therefore, whatever the angle A, one can select the value of the angle $\alpha$ such that the angle C obtained, preferably at least equal to 20°, assures a good anchoring of the plate 4 in the support 5, that is to say a good firmness and a good tightness, the reinforcements 51 and 52 surrounding each anchoring zone 411. For example, when the angle A is equal to 180°, that is to say when the faces 53 and 40 connect tangentially with each other along the bend line 4111, the angle $\alpha$ is selected preferably at least equal to 20° and at most equal to 90°.

The mechanical strength of the assembly 400 and its tightness are particularly good when the plate 4 has a porous structure, for instance a sintered structure, and when the bends 41 are obtained by a mechanical operation carried out on the plate 4, for instance a shaping in a press. In fact, there are obtained in this manner microcracks which permit a limited migration of the moldable material or materials. In this case, the value of the angle $\alpha$ preferably does not exceed 60°, since a bend of an angle $\alpha$ greater than 60° may cause a decrease in the mechanical strength of the plate 4 as a result of excessive cracks, this angle $\alpha$ being then preferably substantially equal to 45°.

The plate 4 may comprise an additional bend 42, located at the periphery of the bend 41 of angle $\alpha$, as shown in FIG. 4. The angle $\beta$ of this bend 42, determined in a manner similar to the angle $\alpha$ by the face 4110 of the bend 41 and the extension 4200 of the corresponding face 420 of the peripheral portion 421 of the bend 42, is of a direction opposite that of the angle $\alpha$ of the corresponding bend 41, that is to say the angle $\beta$ is located inside the plate 4, said angle $\beta$ being measured, in the vicinity of the bend line 4112 of the corresponding bend 42, in a plane perpendicular to the face 4110 of the anchoring zone 411 and to the extension 4200 of the face 420, said bend line 4112 separating the faces 4110 and 420.

One thus further improves the mechanical strength and the tightness of the assembly 400, the additional bend 42 being preferably on the inside of the support 5. The absolute value of the angle $\beta$ is preferably substantially equal to that of the corresponding angle α, as shown in FIG. 4.

If h is the distance between the bend lines 4111 and 4112 which form the ends of the face 4110 of the anchoring zone 411, said distance being measured in a plane containing the corresponding angle α and perpendicular to the portion of face 40 adjacent the face 4110, h is preferably between e and 6e, e being the thickness of the plate 4 when said thickness is constant, or the thickness of the plate 4 in the vicinity of said anchoring zone 411 if said thickness is variable.

In the assembly 400 thus described, the face 53 of the support 5 and the face 40 of the plate 4 can, for instance, form a uniform flat surface which permits a particularly homogeneous flow of the fluid with which they are in contact when the assembly 400 is mounted in the electrochemical device, the good coherence of the assembly 400 also permitting good tightness with respect to this fluid.

This arrangement, in which the faces 53 and 40 connect tangentially with each other, is particularly useful in the event that the fluid contains particles, since a connection of angle A other than 180° runs the risk of causing a catching of the particles. One can also, for instance, contemplate assemblies in accordance with the invention such that the faces 53 and 40 of the support 5 and of the plate 4, respectively, connect with each other substantially tangentially, without their being in the extension of each other.

FIG. 6 shows such an assembly 60 in accordance with the invention. The constituent elements of this assembly 60 are the same as those of the assembly 400, with the difference that the faces 54 of the support 5 which connect tangentially with the face 40 of the plate 4 have the shape of portions of cylinders of revolution of radius r, the faces 54 and 40 thus assuring a uniform passage for the flow of the fluid in the electrochemical device, this fluid, for instance, possibly containing particles.

When the bends are obtained by mechanical operation, the operation can possibly be carried out directly in the mold. On the other hand, the process in accordance with the invention is applicable to any known molding operation, such as, for instance, injection molding. The moldable materials used for the molding may be very different, inorganic, metallic, or organic, for instance elastomeric, thermoplastic, or thermosetting polymers.

The support 5 is made by molding two reinforcements 51 and 52 around the anchoring zone 411 of the plate 4, but it is also possible to produce the support 5 by molding a single reinforcement or more than two reinforcements, the materials of these reinforcements being either identical or different.

It may also be advantageous, in order to increase the speed of production, to introduce one or more reinforcements which have already been prepared, for instance in the form of special shapes, into the mold together with the plate, the rest of the support being produced by molding one or more materials in order to assure the bond between the different components of the assembly.

FIG. 7 shows such as assembly 70. This assembly 70 is produced by arranging the plate 4 on a profiled member 55 of a support 5 in a mold (not shown). This profiled shape comprises a groove 551, on the bottom of which there rest the bends 41 and 42 via the faces thereof opposite the face 40 of the plate 4. A moldable material is injected into the mold so as to fill up the empty space of said groove 551, the smooth face 561 of this reinforcement 56 which is thus obtained connecting, for instance, substantially tangentially to the face 40.

FIG. 8 shows, in a section similar to that of FIG. 4, another assembly 80 in accordance with the invention, similar to the assembly 400 shown in FIGS. 4 and 5, the angle A being equal to 180°. In this assembly 80, the plate 4 is a gaseous diffusion electrode. This electrode 4 comprises a porous body 43. Against one face 431 of this porous body 43 a porous layer 44 is applied, which is intended to serve as a hydrophilic separator.

The face of this separator 44 opposite the face 431 of the body 43 constitutes the face 40 of the plate 4. On the face 432 of the body 43 which is opposite the face 431 there is applied a porous layer 45 intended to serve as a hydrophobic separator. The thicknesses of the separators 44 and 45 forming part of the electrode 4 are preferably small as compared with the thickness of the body 43, these thicknesses being measured in the central zone of the electrode 4, the ratio between each of the thicknesses of the separators and the thickness of the body 43 being for instance between 0.25 and 0.05. The body 43 has a fine metallic grid 430 intended to serve as electron collector and electrically connected with a metal rod 6 intended to be connected to an electric terminal in the electrochemical device. By way of illustration and not of limitation, the assembly 80 is made in the following manner: The body 43 is prepared in known manner by the sintering, in the form of a substantially rectangular plate, of a mixture of powdered carbon black and powdered nickel, which mixture is arranged around the nickel grid 430, said body containing silver as the catalyst and polytetrafluorethylene as the hydrophobic agent.

The hydrophilic separator 44 is produced by dispersing fibers onto the face 431 from a solution of one or more organic polymers in a solvent or a solvent mixture, as described in U.S. applications Ser. Nos. 748,487 and 835,733, filed Dec. 8, 1976 and Sept. 22, 1977, respectively, the entire disclosures of which are hereby incorporated by reference herein.

By way of example, this dispersion is effected from a solution of polyvinylchloride in a mixture of tetrahydrofuran and cyclohexanone, the respective proportions (parts by weight) of polymer, tetrahydrofuran, and cyclohexanone being 15-70-15, respectively.

The hydrophobic separator 45 is produced by applying a sheet of polytetrafluoroethylene onto the face 432 of the body 43.

The body which is thus covered with the separators 44 and 45 is then shaped in a press in such a manner as to obtain the bends 41 and 42, these bends surrounding the rectangular face 40 of the plate 4 (FIG. 5). The angles α and β (not shown in order not to clutter FIG. 8 of the drawing) have absolute values which are substantially equal to 45°.

The electrode 4 which is thus shaped is placed in a mold (not shown) with the metal bar 6, for instance of copper, this bar being placed against one of the sides of the electrode 4, and the reinforcements 51 and 52 are obtained by molding resin compounds, comprising for instance an epoxy resin, for example resin Epikote 828 from the Shell Company, around the edges of the electrode and around the bar 6, one end of which remains free, the faces 53 and 40, in the extension of each other, forming a flat surface.

The desirability of effecting the press shaping on an electrode having the separators described is due to the fact that this shaping causes the appearance of microfissures both in the body 43 and in the separators 44 and 45 and therefore a good mechanical strength of the assembly 80 as a result of a migration of the moldable compound into these microfissures during the molding. In order to avoid excessive migration, the content of fillers in the moldable compound is maintained preferably at least equal to 80% by weight of the total mixture.

The assembly 80 is used, for instance, in an electrochemical generator of the metal/air type whose anode compartment contains in movement a liquid electrolyte, in which there are contained particles formed at least in part of an anodic active metal, in particular zinc. Such a generator 9 is shown in FIG. 9. This generator 9 comprises an anode compartment 7 and a cathode compartment 8. Within the cathode compartment 8 there is arranged the assembly 80 comprising the electrode 4 which is used as an air or oxygen diffusion cathode, the cathodic active material being oxygen.

The conduits for the entrance and departure of the gas into and from the cathode compartment 8 are indicated diagrammatically by the arrows F8 and F'8. The air or oxygen arrives in the cathode compartment 8 in contact with the hydrophobic separator 45, which is intended in known manner to avoid the migration of the electrolyte through the entire thickness of the cathode 4.

The anode compartment 7 comprises an anode collector 71 arranged opposite the hydrophilic separator 44 and consisting for instance of a metal sheet. The anode compartment 7 contains an alkaline aqueous electrolyte (not shown) in which there are contained zinc particles 72, the hydrophilic separator 44 being permeable to the electrolyte and impermeable to the zinc particles 72. The electrolyte and the zinc particles 72 constitute the anode of the generator.

A device, diagrammatically indicated by the arrow F7, makes it possible to introduce into the anode compartment 7 the electrolyte and the zinc particles 72 which flow in the anode compartment 7 between, on the one hand, the anode collector 71 and, on the other hand, the surfaces 40 and 53 of the assembly 80. The zinc particles 72 are oxidized during the course of their contacts with the collector 71, losing electrons, while the oxygen is reduced in the gaseous diffusion electrode 4 by electrons coming from the discharge circuit (not shown) disposed between the positive terminal P connected to the rod 6 and the negative terminal N connected to the anode collector 71. A device diagrammatically indicated by the arrow F'7 makes it possible to evacuate from the anode compartment 7 the electrolyte which contains the zinc particles 72 which have not been entirely consumed by electrochemical oxidation. A path 91 outside the anode compartment 7 makes it possible to recycle the electrolyte and the particles 72 into the feed device F7 from the evacuation device F'7 via a pump 910 and a surge tank 911. A device 912 leading into the path 91 makes it possible to introduce zinc particles into said path so as to maintain the percentage by weight of zinc in the electrolyte constant during each test.

The operating conditions, which are in no way limitative, may for instance be as follows:

electrolyte: 4–12 N potassium hydroxide solution (4 to 12 mols of potassium hydroxide per liter), average size of the zinc particles introduced into the electrolyte: 10–20 microns, percentage by weight of zinc in the electrolyte: 20–30% of the weight of the electrolyte, speed of circulation of the electrolyte in the anode compartment: 10–30 m/minute.

One thus continuously obtains a power of the order of 50 watts by maintaining the amount of zinc dissolved in the electrolyte at less than a value above which the zinc particles would become passivated, this limit being, for instance, 120 g/L in the case of 6 N potassium hydroxide solution. This regulation is obtained, for instance, by regenerating the electrolyte in an annexed installation or by replacing the zincated electrolyte by a pure solution of potassium hydroxide when the critical value is reached. The operation of the generator is thus limited only by the life of the diffusion electrode 4, namely several thousands of hours, since no disturbance of the flow and no degradation of the assembly 80 are observed.

On the other hand, the use in this same generator of assemblies similar to those shown in FIGS. 1 to 3 comprising an electrode identical to the electrode 4 but without bend rapidly leads to obstruction of the anode compartment 7, the operating conditions being the same as previously. This obstruction is due to the catching of the particles on the irregularities of the faces of these assemblies in contact with the electrolyte, which irregularities are due either to the production of the assemblies or to the degradation of these assemblies in the generator.

Furthermore, the poor tightness of these assemblies leads to a migration of the electrolyte towards the air of oxygen in contact with the hydrophobic separator 45, which very detrimentally affects the performance of the electrode 4.

Of course, the invention is not limited to the embodiments which have been described above, on basis of which one can contemplate other modes and embodiments, without thereby going beyond the scope of the invention.

What is claimed is:

1. In an electrochemical device, an assembly comprising a plate, which constitutes a gaseous diffusion electrode, said electrode comprising a porous body with an electron collector, and a support for the plate, characterized by the fact that
(a) the plate has at least one bend, with a bend line, on at least one edge of the plate, a peripheral portion of said bend, referred to as the anchoring zone, being situated in the support;
(b) at least a portion of the support is formed of one or more materials molded onto said anchoring zone;
(c) a face of the support adjacent to the anchoring zone is connected with a face of said plate, along a connecting line, in the form of a uniform junction surface;
(d) an angle C determined, in the vicinity of the connecting line, by the junction surface and the face of the anchoring zone corresponding to said face of the plate is at least equal to 20°;
(e) said face of the support and said face of the plate are intended to be in contact with an electrolyte;
(f) the porous body comprises sintered particles;
(g) the bend is due to a press shaping of the plate leading to microfissures at least in the porous body, said microfissures containing some of the molded material(s);

(h) an angle α, referred to as the angle of the bend, is determined, in the vicinity of the bend line, by said face of the plate and the extension of the corresponding face of the anchoring zone, said angle α being at most equal to 60°.

2. The assembly according to claim 1, characterized by the fact that the connecting line is substantially identical with the bend line.

3. The assembly according to claim 2, characterized by the fact that the face of the plate and the junction surface are connected to each other substantially tangentially and by the fact that the angle α is at least equal to 20°.

4. The assembly according to claim 3, characterized by the fact that the face of the support and the face of the plate are in the extension of each other and form a substantially flat surface.

5. The assembly according to claim 3, characterized by the fact that the face of the support is a portion of a cylinder of revolution.

6. The assembly according to claim 1, characterized by the fact that the plate has an additional bend located at the periphery of the bend of angle α, the angle β of said additional bend, determined in a manner similar to the angle α, being in opposite direction to the angle α.

7. The assembly according to claim 6, characterized by the fact that the absolute value of the angle β is substantially equal to that of the corresponding angle α.

8. The assembly according to claim 1, characterized by the fact that the angle α is substantially equal to 45°.

9. An electrochemical device employing an assembly according to claim 1.

10. The assembly according to claim 1, characterized by the fact that said face of the plate is constituted by a face of a porous hydrophilic separator applied on the porous body.

11. The assembly according to claim 1, characterized by the fact that a porous hydrophobic separator is applied on the face of the porous body opposite said face of the plate.

12. The assembly according to claim 1, characterized by the fact that the press shaping is carried out in a mold.

* * * * *